US012572217B2

(12) United States Patent
Lehmann et al.

(10) Patent No.: US 12,572,217 B2
(45) Date of Patent: Mar. 10, 2026

(54) GESTURE INTERFACE CONTROL OF A MOBILE STORAGE SYSTEM

(71) Applicant: SPACESAVER CORPORATION, Fort Atkinson, WI (US)

(72) Inventors: Steven Mark Lehmann, Fort Atkinson, WI (US); Brian Patrick Bourke, Milton, WI (US); Eric James Wipperfurth, Fort Atkinson, WI (US)

(73) Assignee: SPACESAVER CORPORATION, Fort Atkinson, WI (US)

( * ) Notice: Subject to any disclaimer, the term of this patent is extended or adjusted under 35 U.S.C. 154(b) by 20 days.

(21) Appl. No.: 18/799,175

(22) Filed: Aug. 9, 2024

(65) Prior Publication Data

US 2025/0060830 A1     Feb. 20, 2025

Related U.S. Application Data

(60) Provisional application No. 63/520,385, filed on Aug. 18, 2023.

(51) Int. Cl.
| | |
|---|---|
| *G06F 3/01* | (2006.01) |
| *A47B 53/02* | (2006.01) |
| *G06F 3/02* | (2006.01) |
| *G06F 3/0488* | (2022.01) |

(52) U.S. Cl.
CPC .............. *G06F 3/017* (2013.01); *A47B 53/02* (2013.01); *G06F 3/011* (2013.01); *G06F 3/02* (2013.01); *G06F 3/0488* (2013.01)

(58) Field of Classification Search
CPC . G06F 3/017; G06F 3/011; G06F 3/02; G06F 3/0488; A47B 53/02
See application file for complete search history.

(56) References Cited

U.S. PATENT DOCUMENTS 6,112,917 A * 9/2000 Baker .................... A47B 53/02
                                                     384/58
7,032,762 B2 * 4/2006 Miyazaki ............... A47B 53/02
                                                     211/1.51

(Continued)

FOREIGN PATENT DOCUMENTS

CN          215014792 U     12/2021
WO          2021035285 A1    3/2021

*Primary Examiner* — Thomas D Alunkal
(74) *Attorney, Agent, or Firm* — Andrus Intellectual Property Law, LLP

(57)     ABSTRACT

A mobile storage system includes a series of storage units movable relative to each other to create an aisle or aisles between adjacent storage units. The mobile storage system includes a gesture sensor on each storage unit that is able to detect movement of a hand of a user near the gesture sensor. The gesture sensor communicates the detected movement of the user's hand to a control unit of the mobile storage system such that the control unit can coordinate the movement of the storage units. The gesture sensor includes a light emitter and a light detector that operate to detect the movement of the user's hand. Based on the direction of movement detected, the control unit can move the storage units or activate a light or other device. A method of operating the mobile storage system based on the sensed movement detected by the gesture sensor is also disclosed.

20 Claims, 5 Drawing Sheets

(56)  References Cited

U.S. PATENT DOCUMENTS

| | | | |
|---|---|---|---|
| 7,508,145 B2 * | 3/2009 | Bourke | A47B 53/02 |
| | | | 312/201 |
| 8,823,951 B2 * | 9/2014 | Mimeault | G01V 8/20 |
| | | | 356/614 |
| 9,411,423 B2 * | 8/2016 | Heubel | G06F 3/016 |
| 9,983,680 B2 * | 5/2018 | Alcocer Ochoa | G06F 3/017 |
| 10,413,064 B1 * | 9/2019 | Lu | G05B 15/02 |
| 10,607,413 B1 * | 3/2020 | Marcolina | G06V 40/28 |
| 11,675,617 B2 * | 6/2023 | Herring | G06F 9/4831 |
| | | | 718/103 |
| 2018/0056989 A1 * | 3/2018 | Donald | G06F 3/017 |
| 2019/0297139 A1 * | 9/2019 | Bernath | H04L 67/63 |
| 2020/0301433 A1 * | 9/2020 | Katayama | G06Q 20/3224 |

* cited by examiner

GESTURE INTERFACE CONTROL OF A MOBILE STORAGE SYSTEM

CROSS REFERENCE TO RELATED APPLICATION

The present application is based on and claims priority to U.S. Provisional Patent Application Ser. No. 63/520,385, filed Aug. 18, 2023, the disclosure of which is incorporated herein by reference.

BACKGROUND

The present disclosure relates to a mobile storage system, and more specifically to a mobile storage system that includes a touch-free control system that controls the movement of the storage units based on sensed gestures or actions by a user.

A mobile storage system typically consists of a series of storage units that are movable on rails or the like toward and away from each other. Movement of the storage units is controlled so as to selectively create an aisle between an adjacent pair of storage units. When an aisle is created, a user is able to enter the aisle to access an area of one or both of the storage units that form the aisle, such as to remove an object from one or more of the storage units or to place an object on or in one or more of the storage units. Mobile storage systems of this type are commonly available from a number of different manufacturers, including Spacesaver Corporation of Fort Atkinson, Wis.

Currently available mobile storage systems include a user interface on a control panel that provides various discrete buttons or a touch-screen that requires physical contact in defined areas to provide instructions to the control unit, which then controls the movement of the storage units. Such a control system and user interface require the operator to touch the discrete buttons or virtual buttons shown on the display screen on the user interface, which can transfer dirt and/or germs to the user interface. Further, the requirement of physical touch with the user interface limits the use when the user does not have an available hand, such as when carrying an item or items to be placed on shelves on the storage units.

It is therefore an object of the present disclosure to design and implement a control system and method that controls the movement of the storage units based on gestures from the user and thus allows for the hands free or hands full operation of the user interface.

SUMMARY

The present disclosure relates to a mobile storage system that uses gestures of a user to control the movement of the storage units. A control system for the mobile storage system receives detection information from gesture sensors located on each of the storage units to detect the movement of a user, which eliminates any physical touch and prevents the transfer of dirt and germs via contact and allows for hands free operation.

The mobile storage system of the present disclosure includes a plurality of storage units that are each movable toward and away from each other along a support surface to selectively create an aisle or aisles between adjacent storage units. A control unit is in communication with each of the plurality of storage units and is operable to control the movement of the storage units to create the desired aisles between the storage units.

In accordance with the present disclosure, each of the plurality of storage units includes a gesture sensor. The gesture sensor is operable to detect movements of the user in a location near the gesture sensor. In an exemplary embodiment, the movements of the user include hand movements near the gesture sensor in a desired direction of movement for the storage unit. As an example, a right swipe of the user's hand near the gesture sensor will indicate a desire to move the storage unit to the right while a left swipe of the user's hand will indicate a desire to move the storage unit to the left. The gesture sensor can also detect movement of the user toward or away from the gesture sensor and the stationary presence of the user for a period of time. Each of the gesture sensors is in communication with the control unit such that the control unit receives the desired movement commands from the gesture sensor.

The control unit of the mobile storage system controls the movement of the plurality of storage units in response to the movement of the user that is detected by the gesture sensor associated with the storage unit. The control unit is able to control the movement of the storage unit based on the type and direction of the sensed movement of the user near the detection sensor.

In one exemplary embodiment, a control panel is included on each of the plurality of storage units and the gesture sensor is included in the control panel. In other embodiments, the gesture sensor can be located anywhere on the end panel of the storage unit at a height such that it can sense the movement of a hand of the user.

The control panel can further include either a touch screen or a plurality of activation buttons that allow the user to manually provide movement commands to the control unit of the mobile storage system. The manual commands could be used in addition to the gesture sensor such that commands from the user can be determined in more than one way.

In one exemplary embodiment, the gesture sensor includes a gesture integrated circuit, a light emitter and a light detector. The light emitter is activated to generate a source of illumination light over an illumination area. If the user's hand or other element is within the illumination area, light is reflected back toward the gesture sensor and is detected by the light detector. Based upon the time the reflected light is detected after the light emitter is activated, the gesture integrated circuit can determine the distance of the user's hand from the gesture sensor. Further, based on the location of the reflected light received, the integrated circuit can determine the location of the hand of the user. This information is relayed to the control unit, which can then make control decisions for the movement of the storage unit. In one contemplated embodiment, the light emitted and detected is infrared light.

The present disclosure is also directed to a control panel that can be either initially installed in the mobile storage system or can be used to replace the manual control panel on the mobile storage system. The control panel includes a gesture sensor that is operable to detect the movement of the user in a location near the gesture sensor. The gesture sensor is in communication with the control unit of the mobile storage system to relay the detected movement to the control unit. Based on the information received from the gesture sensor, the control unit can control the operation of the plurality of storage units.

The control panel can further include either a touch screen or a plurality of activation buttons that allow the user to manually provide movement commands to the control unit of the mobile storage system. The manual commands could be used in addition to the gesture sensor such that commands from the user can be determined in more than one way.

In one exemplary embodiment, the gesture sensor includes a gesture integrated circuit, a light emitter and a light detector. The light emitter is activated to generate a source of illumination light over an illumination area. If the user's hand or other element is within the illumination area, light is reflected back toward the gesture sensor and is detected by the light detector. Based upon the time the reflected light is detected after the light emitter is activated, the gesture integrated circuit can determine the distance of the user's hand from the gesture sensor. Further, based on the location of the reflected light received, the integrated circuit can determine the location of the hand of the user. This information is relayed to the control unit, which can then make control decisions for the movement of the storage units.

The present disclosure is further directed to a method of controlling the movement of each of a plurality of storage units of a mobile storage system. The method includes initially detecting the movement of a user at a location near a gesture sensor included on each of the storage units. The detected movement by the gesture sensor is interpreted and communicated to the control unit of the mobile storage system. Based on the interpreted movement, the control unit determines the desired direction of movement of the storage unit and operates the storage unit if such action is allowed.

The control unit determines if the detected movement of the user occurred within a trigger distance from the gesture sensor. The trigger distance is set to make sure the user is close enough to the storage unit and gesture sensor and that inadvertent movements do not trigger movement of the storage units.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
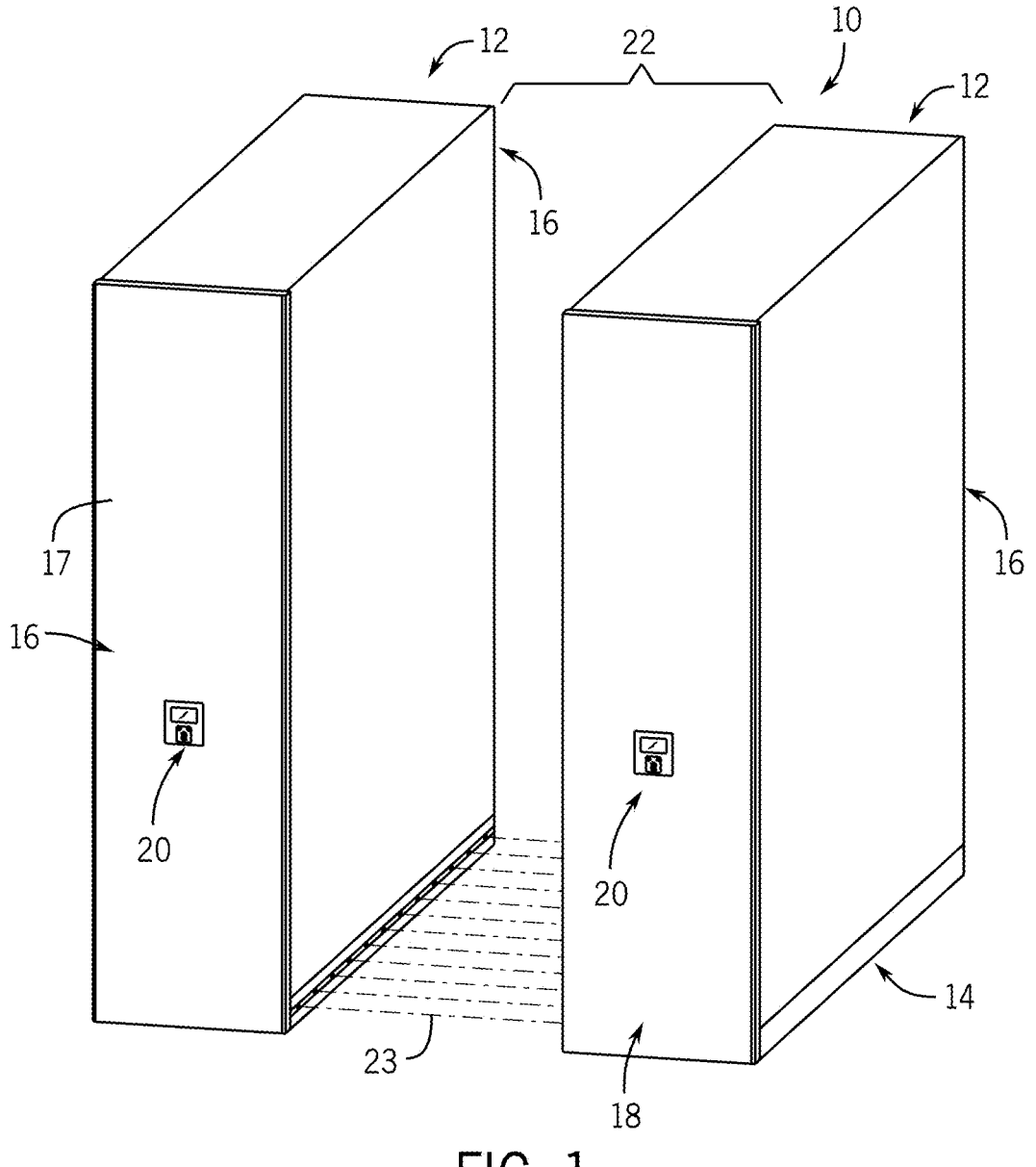
FIG. 1 is a perspective view of a representative pair of adjacent mobile storage units, such as are incorporated into a mobile storage system having a number of such units, incorporating the interface control of the present disclosure.

FIG. 1 illustrates a mobile storage system 10 that includes a series of mobile storage units 12. While FIG. 1 illustrates a pair of mobile storage units 12, it is understood that the mobile storage system 10 may include any desired number of storage units 12, and that the storage units 12 may have any desired length, width, height and configuration. One or both of mobile storage units 12 may be moved both toward and away from the other, typically by means of wheels or rollers associated with the storage units 12 that are movable on rails or tracks mounted in a floor or other supporting surface, in a manner as is known. In other contemplated embodiments, the rails or tracks can be eliminated and the storage units 12 would be movable along a floor surface and would include sensors to control the orientation of the storage units 12 during such movement. The storage units 12 may be movable using any satisfactory known type of drive system, such as an electric motor-powered drive system.

In a typical construction, each mobile storage unit 12 includes a carriage 14 to which one or more vertical storage members 16 are mounted. As is known, storage members 16 may be in the form of shelving units, cabinets, etc. Each carriage 14 typically includes spaced apart sets of wheels that are movable on the rails or tracks mounted in the floor or other supporting surface. Each carriage 14 also includes a drive arrangement, which typically includes an electric motor and a drive system interposed between the motor output and the wheels for providing movement of the storage unit 12. Representatively, each storage unit 12 may include an end panel 18 that includes a control panel 20 that is operated by a user to selectively operate the motor or other drive arrangement to move the storage unit 12 in a selected direction. In this manner, the adjacent storage units 12 can be selectively moved apart to create an aisle 22 therebetween and can be selectively moved together to eliminate aisle 22. The mobile storage unit 10 may include a series of sensors that create a series of sensing beams 23 that are broken when a user is present in the aisle 22 between the storage units 12. In this way, the sensors are able to detect the presence of a person or object within an aisle formed between the storage units to limit the movement of the storage units when such person or object is detected.

Figure 2:
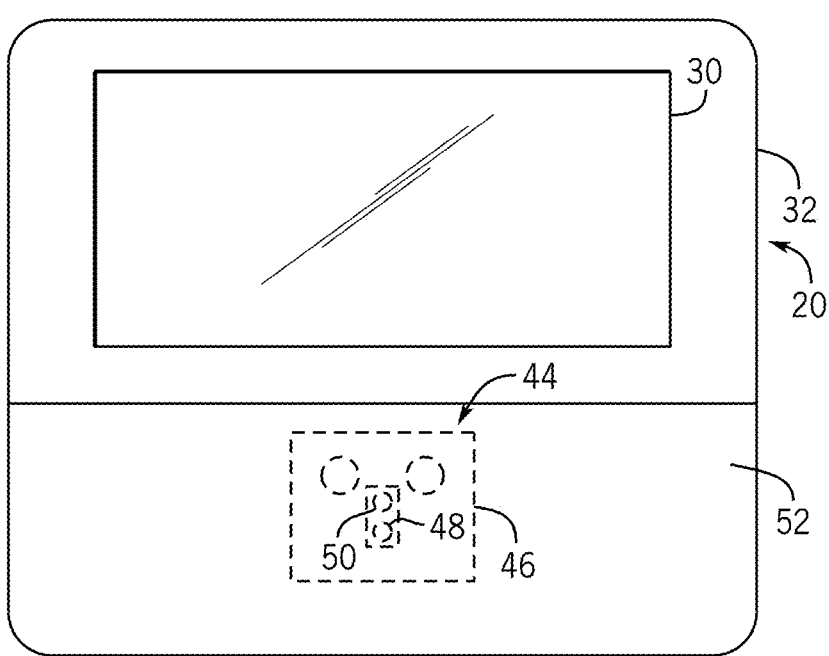
FIG. 2 is a front view of a control panel constructed in accordance with a first embodiment of the present disclosure.
Figure 3:
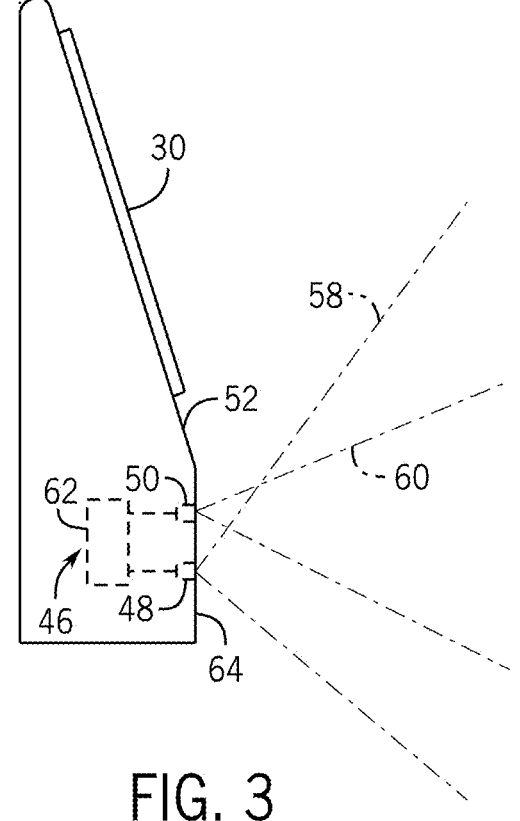
FIG. 3 is a side view of the control panel shown in FIG. 2.

FIG. 2 illustrates a front view of one exemplary embodiment of the control panel 20 that is used to control the movement and operation of each of the individual storage units that are included in the mobile storage system of the present disclosure. The control panel 20 shown in FIG. 2 includes a touchscreen display panel 30 that allows the user to view information in a graphic form. The display panel 30 can be a touch screen that allows the user to enter information and respond to prompt shown on the screen. However, the display panel 30 could also just be a display for showing information to the user since the control panel 20 is designed in accordance with the present disclosure to respond to user gestures and eliminate the need for any touch. As shown in FIG. 3, the display panel 30 is controlled by a control unit 62. The control panel 20 includes a plastic outer housing 32 that allows the entire control panel 20 to be mounted to the end panel of the storage unit.

Figure 4:
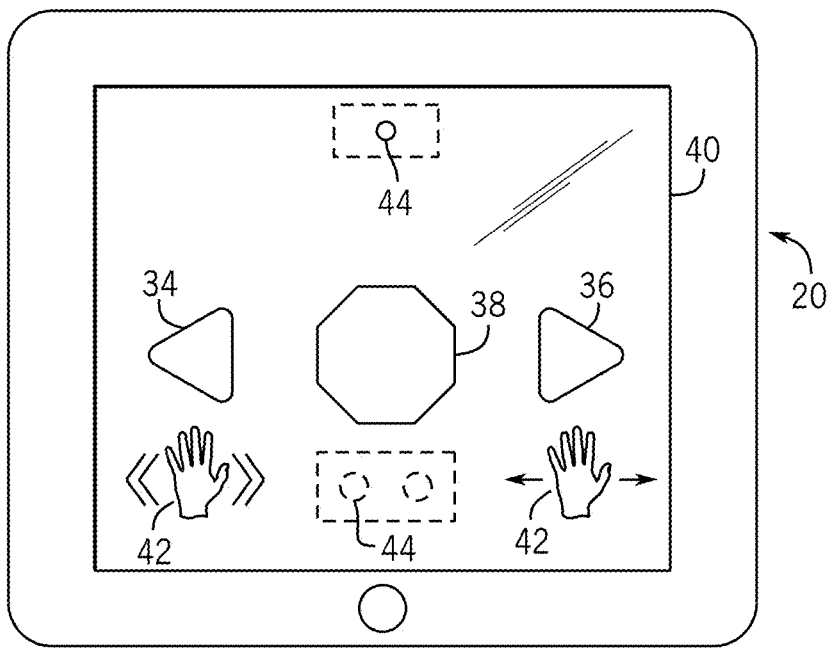
FIG. 4 is a front view of a control panel constructed in accordance with a second embodiment of the present disclosure.

FIG. 4 illustrates a second type of control panel 20 constructed with a second embodiment of the present disclosure. In the embodiment shown in FIG. 4, the control panel 20 is designed to emulate a currently available control panel that includes discrete activation buttons. In this embodiment, the control panel includes a left movement button 34, a right movement button 36 and a stop button 38. These three buttons 34, 36 and 38 allow the user to manually press each button to move the storage unit in a desired direction and to ultimately stop such movement. In accordance with the present disclosure, an automated sensing system is added to the control panel 20 as will be discussed in greater detail below. In the embodiment shown in FIG. 4, the front display area 40 includes hand graphics 42 that provide visual clues for the operator to suggest that gesture control is available and to signal the intended hand motion that is used to initiate movement of the mobile storage unit in the desired direction.

In the embodiments shown in FIGS. 2 and 4, an infrared gesture sensor 44 is shown. It is understood that the gesture sensor 44 could be located in the positions shown in FIGS. 2 and 4. It is also conceivable that the gesture sensor 44 could be located on end panel 17 shown in FIG. 1. The gesture sensor 44 is operable, along with a control unit, to sense the hand movement of a user and convert such sensed movement to commands to move the mobile storage unit in the desired direction.

In the embodiment shown in FIG. 4, the display area 40 may include a printed graphic image that is on a label applied to the front surface of the display panel housing. In such an embodiment, the gesture sensor 44 would be located behind a clear portion of the label so that the gesture sensor 44 could see through the printed label and operate in accordance with the present disclosure as will be described.

Referring back to FIG. 2, in the first embodiment of the control panel 20 shown, the gesture sensor 44 includes a gesture integrated circuit 46 which is schematically illustrated in FIG. 2. The gesture integrated circuit 46 could be a commercially available component such as Model VL53L5CXV0GC/1 available from STMicroelectronics. The gesture integrated circuit 46 of the gesture sensor 44 is connected to both an infrared emitter 48 and an infrared detector 50 that combine to detect movement of a user at a location near the front surface 52 of the control panel.

As shown in FIG. 3, the infrared emitter 48 projects a beam of infrared light over an illumination area 58 which is shown by the dashed lines in FIG. 3. The infrared detector 50 has a sensing area 60 that can be either smaller or the same size as the illumination area 58. The infrared detector 50 detects the reflection of infrared light from the emitter 48. The reflected infrared light from the user is used to identify gesture commands from the user. Based on the detected reflected light, the location of the reflected light and the distance of the refection surface, a control unit 62 included as a part of the gesture integrated circuit 46 can make sensing decisions in a manner as will be described in detail below.

As can be understood in FIGS. 2 and 3, the infrared emitter 48 and the infrared detector 50 are positioned behind the lower front face 64 and are positioned such that they have a small, defined view opening, which in turn defines the field of view (FOV) of the gesture integrated circuit 46. The infrared emitter 48 creates an infrared light source that is able to illuminate an object that is positioned close enough to the lower front face 64. Time of flight (TOF) technology is then used to determine the viewing range for the infrared detector 50. As described above, the infrared detector 50 has a field of view 60 for detecting when an object is located in a close enough range to the lower front face 64. As will be described in greater detail below, the control unit 62 divides the field of view 60 into multiple zones such that the control unit 62 can make determinations as to movement of an object in front of the lower face of the control panel 20 between the multiple zones.

Figure 5:
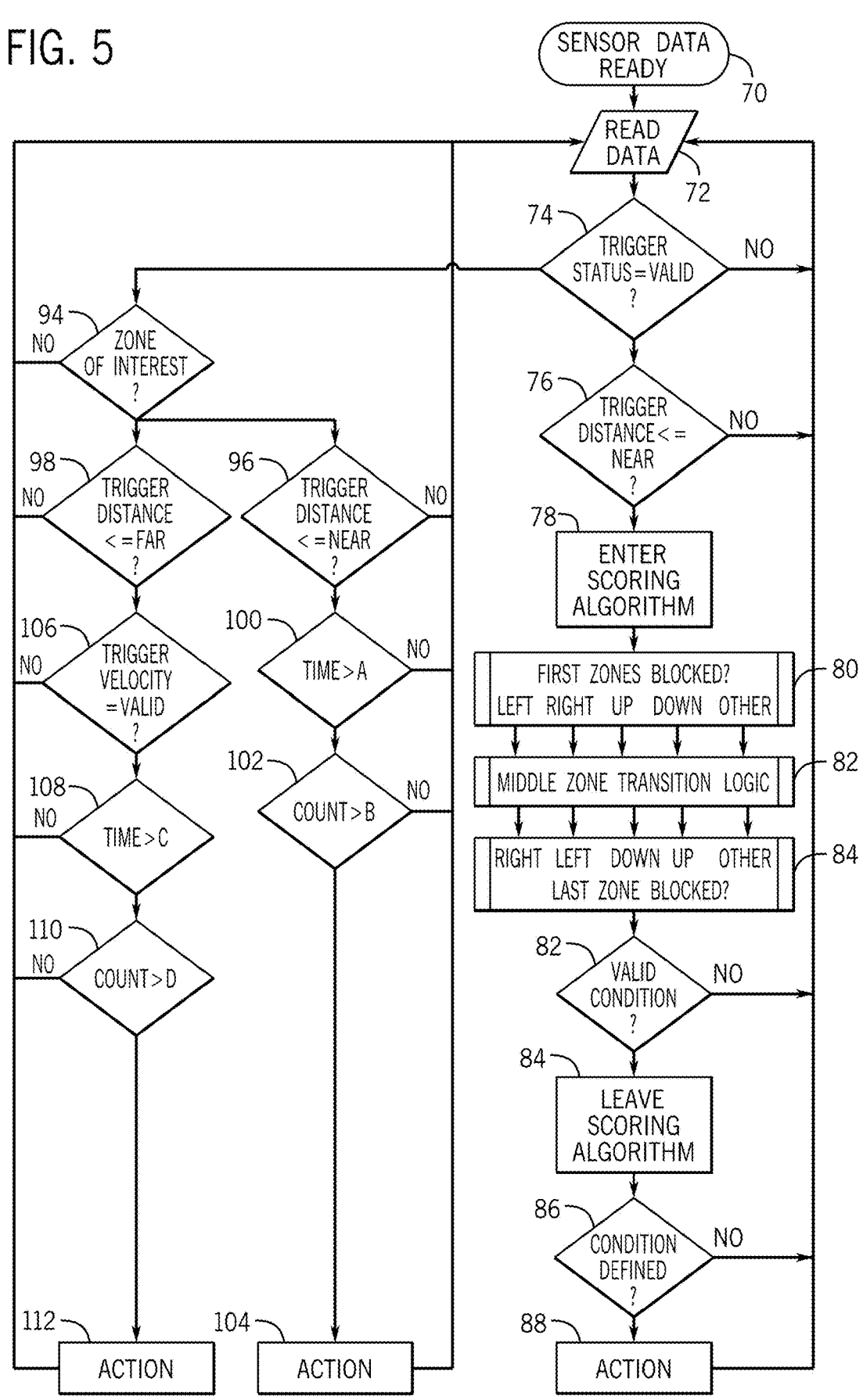
FIG. 5 is a flow chart illustrating an exemplary embodiment of the control of the mobile storage units based on gestures from a user.

Referring now to FIG. 5, there shown is one exemplary embodiment of an operating method in accordance with the present disclosure. In step 70, the gesture integrated circuit of the gesture sensor first determines whether the infrared emitter 48 and infrared detector 50 are ready for operation. Once such operation is available, the system moves to step 72 and causes the infrared emitter 48 to emit infrared light and the infrared detector 50 to receive such reflected infrared light. The system reads the reflected data from the infrared detector and moves to step 74 to determine whether the trigger status is valid.

Before operation of the mobile storage system begins, a custom algorithm is created and installed on the control unit of the mobile storage system to interpret the data from the gesture integrated circuit. In such an algorithm, distance and status ranges of interest are assigned a trigger. The trigger may occur in a sequential or in a parallel order. In the embodiment shown in FIG. 5, the trigger determination occurs in a parallel manner.

During the development of the sensing algorithm, a number of zones within a defined field of view of the detector are defined. The zones are defined from right to left and up to down to define a grid-like pattern. In addition to the zones, the algorithm considers a rate of change and a direction of change, which are defined such that the control unit can determine the proximity of an object, such as a user's hand, and the direction of movement of such item.

Referring back to FIG. 5, if the trigger status is valid, the operating algorithm moves to step 76 to determine whether the trigger distance is less than a "near" distance. As described above, the system uses TOF to determine the distance an object, such as the user's hand, is relative to the front face of the control panel. If the trigger distance is less than the near value, the system moves to step 78 and enters into a scoring algorithm. In accordance with the present disclosure, one method of gesture detection is keeping "score" of zone blockage upon entry and exit of the user's hand within the defined range. As a simple example, a hand passing in the left to right direction within 100 mm of the sensor would trigger the algorithm and the "right" gesture would be identified, and operation associated with such detection would be initiated. During such scoring algorithm, the field of view of the infrared detector would first see the left most zone being blocked followed by zones to the right being blocked in order until the right most zone is blocked in the last detection step. Such sequence of blockages of the sensing zones would indicate that the user made a right gesture thereby indicating that the storage unit should move in the right direction. Such sequence of detection is generally shown in the decision blocks 80-84.

Decision block 82 is used by the algorithm to detect the middle transition zones being blocked while step 84 determines the last zone being blocked. Once the first, middle and last zones have been monitored and the blockage validated, the system moves to step 86 and determines whether the sensed direction of movement is a valid condition. As an example, valid conditions could be left, right, up, down or any other specific hand motion that is determined to initiate operation of the storage units. If a valid condition is detected, the system moves to step 84 and leaves the scoring algorithm. Based upon a determination that the condition is defined in step 86, the system moves to step 88 and the control unit of the mobile storage system performs the action indicated by the gesture.

Although a sequence of operations is described above with reference to the "right" gesture movement, a similar method is applied to detect whether the user would like to move left, up or down. The grid like pattern of the field of view allows the system to detect the movement of a user's hand in each of these directions.

Referring back to step 74, if a trigger is valid, the method also moves in a parallel path to step 94. In step 94, the system determines whether a user's hand is detected in the zone of interest. If the user's hand is within the zone of interest, the system determines whether the trigger distance is less than a "near" threshold in step 96 or less than a "far" threshold in step 98. The near and far thresholds can be selected by the user. In one embodiment, the near threshold is 50 mm while the far threshold is 100 mm. The distance is determined by the TOF sensing technology which determines the range of the operator's hand relative to the control panel.

If the sensed hand is within the near distance threshold in step 96, the method determines in step 100 whether the hand is sensed for a time greater than a duration threshold. If the time is greater than a duration threshold, the system moves to step 102 and determines whether a count is greater than a second, count threshold. These steps can be used by the system to determine whether the user is "hovering" their hand in front of the sensor for greater than a sensing period. If such a determination is made, the system can carry out an action in step 104. Such action may be releasing a lock sequence, activating a light or any other action that may require the user to hover a hand near the sensor for a duration of time.

If the system determines in step 98 that the trigger distance sensed is less than a far threshold, the system moves to step 106 to determine whether the trigger velocity is a valid velocity. This trigger velocity could indicate that the user is moving toward the control panel. If the time of the trigger velocity is sufficient, the system moves to step 110 and determines whether a count is greater than a threshold. If the count is greater than a threshold, the system moves to step 112 and carries out yet another action. Such an action could be activating the gesture sensing algorithm, turning on a light or unlocking the control system.

As can be understood by the exemplary embodiment of the method of operation shown in FIG. 5, the control unit of mobile storage system receives information from the integrated circuit of each of the gesture sensors and is able to detect the presence of the hand of the user and, based upon the movement of the hand, control operation of the storage unit in the same manner as the manual control panel shown in FIG. 4.

Figure 6:
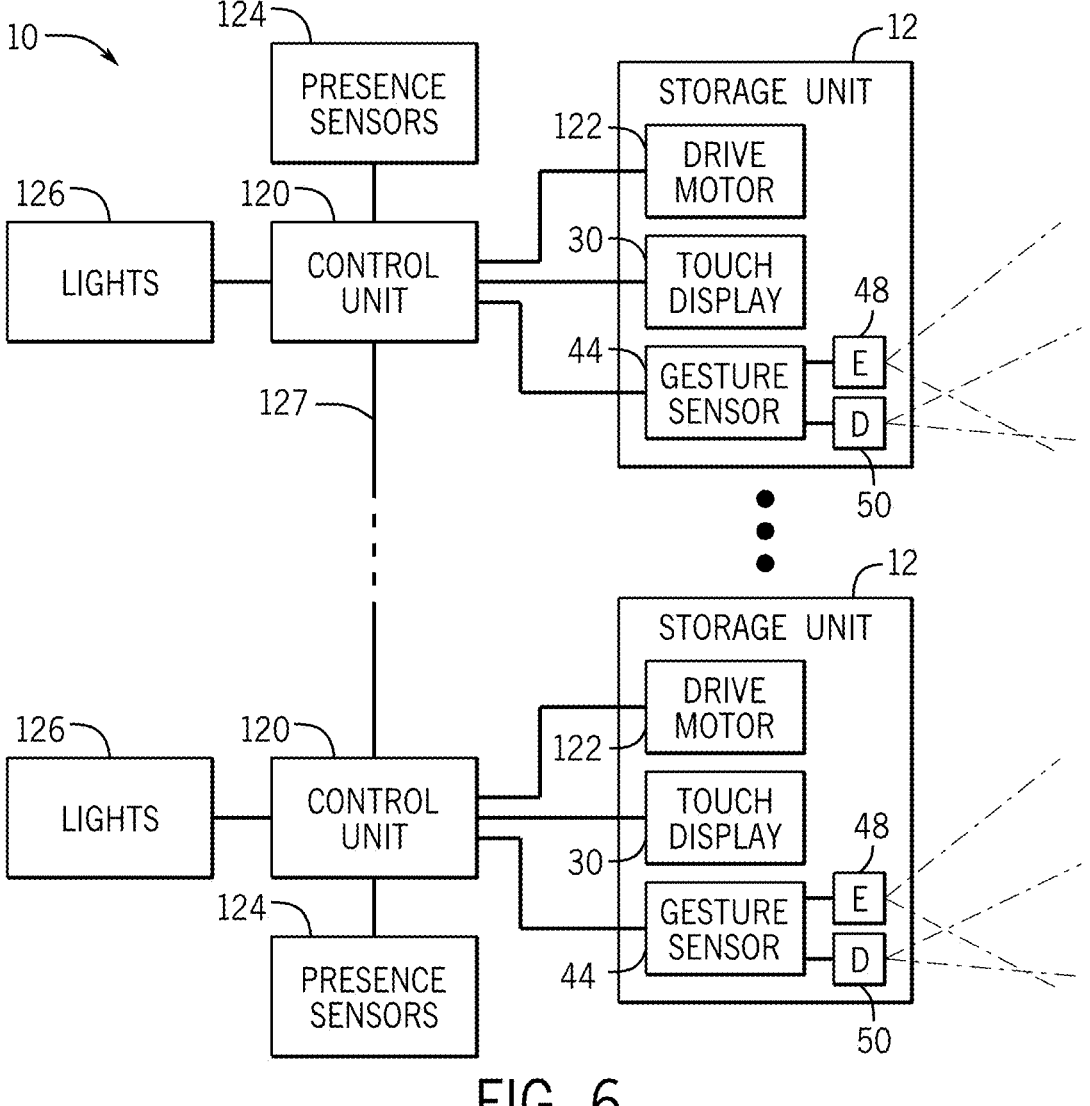
FIG. 6 is a schematic illustration of the operating components of the mobile storage system of the present disclosure.

FIG. 6 is a schematic illustration of the control system for operating the mobile storage system 10 of the present disclosure. In the embodiment shown, only two storage units 12 are shown for simplicity but it should be understood that additional storage units 12 could be included in the mobile storage system 10. The control system for operating the mobile storage system 10 include control units 120 that control and integrate the movement of the storage units 12 connected by communication path 127 that relays various information between the storage units 12. The control unit 120 includes control lines to the drive motor 122, touch display 30 and the gesture sensor 44 included in each of the storage units 12. Although a touch display 30 is illustrated, the touch display could be replaced with the button 34, 36, and 38 as in the embodiment of FIG. 4. Each of the gesture sensors 44 include the infrared emitter 48 and the infrared detector 50 as discussed above.

As discussed above, the gesture sensor 44 includes an integrated circuit that is able to detect the direction of movement of a user's hand and provides this information to the control unit 120. Based on this received information, the control unit 120 can carry out the method and algorithm described with reference to FIG. 5. The control unit 120 operates to control the movement of the storage units 12 and relay various information over communication path 127 with other control units 120 in a known manner similar to a mobile storage system that includes only the manual activation buttons or a touch screen.

In the embodiment shown in FIG. 6, a series of presence sensors 124 are connected to the control unit 120. The presence sensors 124 are operable to detect the presence of a user within an aisle created between two of the storage units 12. In the contemplated embodiment, a light 126 could be included on one or more of the storage units. The control unit 120 can receive an indication from one of the gesture sensors 44 that a user is approaching the storage unit and the control unit 120 would activate the light 126.

In addition to the infrared emitter and infrared detector described above, the gesture sensor 44 can also include light and sound sensors that can detect the approach of a user toward the sensor location. Further, it is contemplated that the control panel will be positioned at an ADA height and location to allow the operation of the mobile storage system to be controlled by a wide range of operators.

As illustrated in FIGS. 2 and 4, the control panel 20 of the present disclosure is a self-contained unit that can be retrofit to current powered mobile systems and allows the removal of a manual touchpad or control panel that includes manual buttons. The gesture sensor 44 including the gesture integrated circuit 46 is positioned directly within the control panel 20 and requires no additional connections other than the power and communication connections that were previously available for currently available control panels.

As described above, the gesture interface control of a storage system in accordance with the present disclosure allows single gestures or a combination of gestures to be associated with a specific command or control within the system. The most basic of operations should be intuitive to an unfamiliar user. The most basic operational controls on a powered mobile system are movement commands such as reset, left, right and stop. Examples of intuitive gestures include: passing an object to within a few inches of a gesture sensor with a motion in the direction of desired movement to clear a locked aisle, with a left motion to start movement in the left direction, with a right motion to start movement in the right direction, and with any detected motion to stop such movement.

Other possible gestures could include passing an object within a few inches of the gesture sensor with an up motion or a down motion to turn on or off lights respectively. Other more complex gestures or combinations of basic left/right/up/down/in/out gestures may be defined to control other features such as stationary carriage, system on/off, a unique user credential allowing/restricting access or the like. As described previously, longer distance detection of an approach (and/or identification of specific symbol or object) could be used for security measures (restricted access), or to activate light or sound to direct attention to elements of interest and instructions for use on the system.

The use of a gesture sensing system to provide a non-contact method of control on a storage system at close proximity (within 4 inches or less) allows the elimination of contact with a control panel. The specific gestures for resetting, movement and stopping a mobile storage system at close proximity are unique in accordance with the present disclosure. The combination of gestures used as a credential for a user on a storage system at close proximity is also a unique feature of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A mobile storage system operable by a user, comprising:

a plurality of storage units movable toward and away from each other to selectively create one or more aisles between adjacent storage units;

a control unit operable to control the position of the plurality of storage units in response to user commands to form the one or more aisles between the storage units; and a plurality of gesture sensors each associated with one of the plurality of storage units, each of the gesture sensors being operable to detect a movement of the user in a location near the gesture sensor, wherein each of the plurality of gesture sensors is in communication with the control unit, wherein the control unit controls the movement of each of the plurality of storage units in response to the movement of the user detected by the gesture sensor associated with the storage unit.

2. The mobile storage system of claim 1 wherein the control unit controls the movement of the storage unit based on a type of movement detected by the gesture sensor associated with the storage unit.

3. The mobile storage system of claim 1 further comprising a control panel included on each of the plurality of storage units, wherein the gesture sensor is included in the control panel.

4. The mobile storage system of claim 3 wherein the control panel includes a touch screen, wherein the control unit controls the movement of the storage unit based on input from the touch screen or the gesture sensor.

5. The mobile storage system of claim 4 wherein the control panel include a plurality of activation buttons that can be depressed by the user, wherein the control unit controls the movement of the storage unit based on depression of the activation buttons or the gesture sensor.

6. The mobile storage system of claim 1 wherein each of the gesture sensors includes an emitter and a detector, wherein the emitter is operable to generate light in an illumination area and the detector is operable to detect reflected light from the user in a sensing area.

7. The mobile storage system of claim 6 wherein the emitter generates infrared light.

8. The mobile storage system of claim 1 wherein the movement of the user detected can be a direction of movement of a hand of the user relative to the gesture sensor.

9. A control panel associated with each of a plurality of storage units of a mobile storage system the includes a control unit that controls the movement each of the plurality of storage units, the control panel comprising:

a gesture sensor operable to detect a movement of the user in a location near the gesture sensor, wherein the gesture sensor is in communication with the control unit to relay the detected movement, wherein the control unit controls the movement of each of the plurality of storage units to create or eliminate one or more aisles between the plurality of storage units in response to the movement of the user detected by the gesture sensor associated with each of the storage units.

10. The control panel of claim 9 wherein the control unit controls the movement of the storage units based on a type of movement detected by the gesture sensor associated with each of the storage units.

11. The control panel of claim 9 further comprising a touch screen, wherein the control unit controls the movement of the storage unit based on input from the touch screen or the gesture sensor.

12. The control panel of claim 9 further comprising a plurality of activation buttons that can be depressed by the user, wherein the control unit controls the movement of the storage unit based on depression of the activation buttons or the gesture sensor.

13. The control panel of claim 9 wherein each of the gesture sensors includes an emitter and a detector, wherein the emitter is operable to generate light in an illumination area and the detector is operable to detect reflected light from the user in a sensing area.

14. The control panel of claim 13 wherein the emitter generates infrared light.

15. The control panel of claim 9 wherein the movement of the user detected can be a direction of movement of a hand of the user relative to the gesture sensor.

16. A method of operating a mobile storage system that includes a control unit operable to control the movement of each of a plurality of storage units along a support surface, the method comprising the steps of:

detecting a movement of a user at a location near one of a plurality of gesture sensors each mounted to one of the plurality of storage units;

interpreting the detected movement of the user in the control unit;

determining the desired direction of movement of the storage unit based on the detected movement of the user by the gesture sensor of the storage unit;

operating the storage unit to move in the desired direction of movement to create or eliminate one or more aisles between the plurality of storage units.

17. The method of claim 16 further comprising the step of determining whether the movement of the user occurred within a trigger distance from the gesture sensor and operating the storage unit only if the detected movement is within the trigger distance.

18. The method of claim 17 further comprising the step of determining a direction of movement of the user and moving the storage unit in the direction of movement.

19. The method of claim 16 further comprising the step of detecting movement of the user toward the gesture sensor and taking a control action upon detection of movement of the use toward the gesture sensor.

20. The method of claim 16 further comprising the step of detecting the movement of the user between sensing zones and determining the direction of movement based on the timing of the detection across the sensing zones.

* * * * *